(12) United States Patent
Tomlinson

(10) Patent No.: US 7,124,035 B1
(45) Date of Patent: Oct. 17, 2006

(54) METHODS AND APPARATUS FOR CLASSIFYING AND SELECTING WINE

(75) Inventor: Douglass W. Tomlinson, San Francisco, CA (US)

(73) Assignee: Taste, Inc., San Francisco, CA (US)

( * ) Notice: Subject to any disclaimer, the term of this patent is extended or adjusted under 35 U.S.C. 154(b) by 0 days.

(21) Appl. No.: 11/190,734

(22) Filed: Jul. 27, 2005

(51) Int. Cl.
G06F 19/00 (2006.01)
(52) U.S. Cl. .............................. 702/23; 705/1; 426/29; 99/275
(58) Field of Classification Search ..................... None
See application file for complete search history.

(56) References Cited

U.S. PATENT DOCUMENTS

| | | | | |
|---|---|---|---|---|
| 5,200,909 | A * | 4/1993 | Juergens ..................... | 702/25 |
| 6,978,243 | B1 * | 12/2005 | Godinot et al. ............... | 705/1 |
| 2001/0044750 | A1 * | 11/2001 | Piotrowski et al. ........... | 705/26 |
| 2002/0042912 | A1 * | 4/2002 | Iijima et al. ................. | 725/14 |
| 2006/0085292 | A1 * | 4/2006 | Lafay ......................... | 705/28 |

OTHER PUBLICATIONS

Internet Web page at www.broadbent-wines.com entitled "Broadbent Wine Tasting Comparison Chart", date unknown.*
Internet Web page at www.bettertastingwine.com entitled "Wine Tasting Score Card and Template", date unknown.*
Internet Web page at www.stratsplace.com entitled "Wine Tasting Sheets", date unknown.*
Internet Web page at www.winecountrygetaways.com entitled "Wine Scoring Sheet", dat unknown.*
Internet web page at www.winebusiness.com entitled: "A better Wine Scorecard?", Nov. 15, 2005.*
Internet Web page at www.virginiawineguide.com entitled "VWG's Scoring System", date unknown.*
Internet Web page at www.wine-searcher.com entitled "Wine-Scores", date unknown.*
Internet web page at www.aboriginemundi.com entitled "Wine Rating Wizard", date unknown.*
Internet Web page at www.californiawinehikes.com entitled "Wine Scoring Sheet", date unknown.*
Internet Web page at www.brewingtechniques.com entitled "The Beer Flavor Wheel", date unknown.*
Internet Web page at www.winearomawheel.com entitled "Wine Evaluation Chart", date unknown.*
Chapman et al. ("Sensory Attributes of Cabernet Sauvignon Wines Made From vines with Different Water Status"), Australian Journal of Grape and Wine Research, Australia, 2005, vol. 11, pp. 339-347.*
Papazian, The Home Brewer's Comparison, 1994, pp. 407-408.*
Internet Web Page at www.brew-monkey.com/brewschool/beerwheel.php entitled "Meilgaard's Beer Flavor Wheel", date unknown.*
Internet Web page at www.beertown.org entitled "Beer Score Sheet", date unknown.*
Internet Web page at www.vinovolo.com entitled "Vino Volo Wine Room", date unknown.*

(Continued)

Primary Examiner—Patrick J. Assouad
(74) Attorney, Agent, or Firm—James Trosino

(57) ABSTRACT

Apparatus and methods are provided for classifying wine in terms of fruit and non-fruit flavors. A first scale is provided for scoring wine in terms of fruit flavor, and a second scale is provided for scoring wine in terms of non-fruit flavor. The first and second scales may be displayed in a two-dimensional chart, and the fruit and non-fruit scores of particular wines may be displayed on the chart to visually communicate wine flavor information.

12 Claims, 9 Drawing Sheets

OTHER PUBLICATIONS

Wine Advocate, issue 156, p. 19, Dec. 2004.
Internet web page, www.bestcellars.com/aboutbc/system.asp.

Internet web page, www.turningleaf.com/LinkedFiles/Tools/AROMA.htm.

* cited by examiner

METHODS AND APPARATUS FOR CLASSIFYING AND SELECTING WINE

BACKGROUND

In recent years, the accessibility of wine has increased tremendously. A consumer may now purchase wine not only at bars, restaurants and wine stores, but also at many supermarkets, warehouse stores, drug stores and convenience stores. In addition, consumers with Internet access may now purchase wine from numerous online wine merchants and wineries. In particular, the Internet has enabled many small wineries to reach a potential market that might otherwise be unavailable to the vintner.

Although wine is now widely available, many people find the process of evaluating and selecting wine to be very intimidating. Indeed, the sheer variety and number of available wines often can seem overwhelming. To aid the wine selection process, some consumers rely on objective factors to categorize wine. For example, wine may be classified based on grape variety or variety blend (e.g., Cabernet Sauvignon, Merlot, Syrah, etc.), growing region or appellation (e.g., Napa Valley, Bordeaux, etc.), vintage (e.g., 1999, 2000, etc.) or brand (e.g., Clos du Bois Cabernet Sauvignon, Stag's Leap Cabernet Sauvignon, etc.). Although these categories provide a way to describe wine, the categories are not reliable predictors of wine flavor, and provide little guidance for comparing flavor differences between wines. As such, a consumer can only guess the wine flavor based on these categories.

To overcome the static nature of such classification systems, several wine experts and wine magazines have developed systems for categorizing wine based on other criteria. For example, some wine critics, such as Robert Parker and Stephen Tanzer, have developed ratings scales to classify wine. The ratings scales typically use a 100-point scale to rate wine quality, with 50 being the lowest and 100 being the highest assigned scores. Each wine is assigned a score or a score range (e.g., 90–100) on the scale based on any of a variety of factors, such as color, appearance, aroma, bouquet and finish. Although such ratings are effective at communicating information regarding overall wine quality, the ratings are of little help in categorizing wine in terms of flavor.

To overcome this limitation, wine scores are sometimes accompanied by written descriptions of a wine's flavor. For example, Wine Advocate, issue 156, page 19 describes one rated wine as "a seriously-endowed smoky effort revealing hints of bacon fat, black raspberries, espresso and vanillin from new oak casks. Dense and full-bodied, with great purity, terrific texture, elevated alcohol (not excessive), and moderate tannin in the long finish . . . . " Although such summaries include lush descriptions that may evoke vivid sensations, the reviews lack any clear or consistent technique for defining or comparing wine flavors. Indeed, it may be difficult for a consumer to compare one wine described as a "seriously endowed smoky effort" with another wine having "a tight, firm beam of mineral, pear and green apple fruit."

In an attempt to add some consistency to the process of characterizing wine, some wine experts have proposed a uniform vocabulary used to describe wine flavor. For example, Dr. Ann C. Noble, of the University of California at Davis, developed a "wine aroma wheel" that includes specific terms used to describe wine flavors. The wine aroma wheel includes three concentric circular wheels. The innermost wheel is subdivided into 12 pie-shaped slices that describe generic wine flavors/aromas (e.g., "floral," "spicy," "fruity," "nutty"). The middle wheel is subdivided into 27 associated pie-shaped slices that further define the wine flavors/aromas of the innermost wheel (e.g., "fruity" is further subdivided into "citrus," "berry," "(tree) fruit," "(tropical) fruit," "(dried) fruit" and "other"). Finally, the outer wheel is subdivided into 87 associated pie-shaped slices that more specifically define the wine flavors/aromas of the middle wheel (e.g., "berry" is further defined as "black berry," "raspberry" and "strawberry" and "black currant/cassis").

To describe the flavors or aromas of a particular wine, a taster first selects one or more of the generic descriptors from the inner wheel, and then further refines the description by successively selecting associated descriptors from the other two wheels. Thus, a particular wine may be described as "skunk/sweaty/green beans/melon," "dusty/rubbery/burnt match/strawberry jam/violet/soy sauce," or any other combination of the specific descriptors of the outer wheel. Although the aroma wheel provides a consistent vocabulary for describing wine flavor, it fails to provide a simple, intuitive system for easily comparing and evaluating wine flavor. Indeed, for many consumers, it may be a bit unwieldy to compare three chardonnays, the first having a "lemon/grapefruit/apple/orange blossom" flavor profile, the second having a "hazelnut/oak/apricot/banana" flavor profile, and the third having a "lemon/pear/butterscotch/vanilla" flavor profile.

To simplify the wine classification process, some systems characterize wine in terms of a relatively small number of flavor categories. For example, Best Cellars, Inc. classifies wine in one of eight "style categories" that include "fizzy," "fresh," "soft," "luscious," "juicy," "smooth," "big" and "sweet." Although such categories may be used to provide very high-level classification of wines, many wines may not easily fit into any of the eight predefined categories. For example, "juicy" wines are defined as "Light-bodied red wines. Fruity, upfront, instantly drinkable," whereas "smooth" wines are defined as "Medium-bodied red wines. Velvety, graceful, deliciously refined." A typical Loire Valley Cabernet Franc is a light-bodied red wine, but is often not particularly fruity. A good Oregon Pinot Noir has strong, upfront fruity flavors, but also is medium-bodied and velvety. Thus, neither wine seemingly would easily fit into any of the broad categories used in the Best Cellars system.

In view of the foregoing, it would be desirable to provide methods and apparatus for classifying wine in a way that is simple and easy to understand.

It further would be desirable to provide methods and apparatus for classifying wine in a way that may be used to communicate relative wine flavor.

It also would be desirable to provide methods and apparatus for classifying wine in a way that may be used to compare flavor differences between wines.

It additionally would be desirable to provide methods and apparatus for consistently and systematically classifying wine.

It also would be desirable to provide methods and apparatus for classifying wine in an all-inclusive manner.

SUMMARY

This invention provides apparatus and methods for classifying wine in terms of apparent fruit and non-fruit flavors. A first scale is provided for scoring wine in terms of relative levels of fruit flavor, and a second scale is provided for scoring wine in terms of relative levels of non-fruit flavor. The first and second scales each have low, medium and high values. The first scale may be calibrated by identifying wine having low, medium and high fruit flavors, and associating the identified wine with the low, medium and high scores, respectively, on the first scale. The second scale may be calibrated by identifying wine having low, medium and high non-fruit flavors, and associating the identified wine with the low, medium and high scores, respectively, on the second scale. A wine may be classified using the first and second scales by tasting the wine, comparing the fruit and non-fruit flavors of the wine to the fruit and non-fruit flavors of other wines that have been associated with scores on the two scales, and then assigning the wine a first score on the first scale and a second score on the second scale.

The first and second scales may be displayed in a two-dimensional wine classification chart, with the first scale displayed along a first axis, and the second scale displayed along a second axis. The center of the first axis may be coincident with the center of the second axis. The fruit and non-fruit scores of particular wines may be displayed on the chart to visually communicate wine flavor information. The wine classification chart may be divided into multiple flavor category regions. The flavor category regions may coincide with the four quadrants formed by the first and second axes.

Wine classification charts in accordance with this invention may be used to communicate fruit and non-fruit flavor information about a wine relative to one or more other wines on the chart. In addition, wine classification charts in accordance with this invention also may be used to record and visually communicate information about fruit and non-fruit flavors of categories or groups of wine. Further, wine classification charts in accordance with this invention may be used to select wine and wine categories based on fruit and non-fruit flavor differences relative to other wine and wine categories.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

Figure 1:
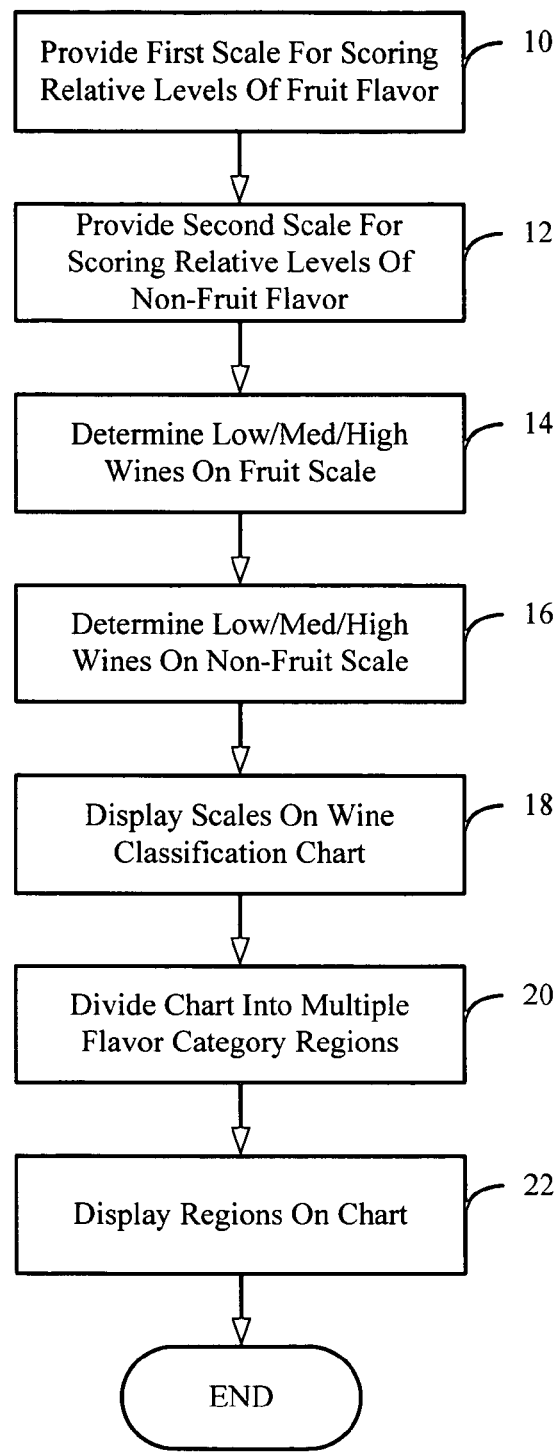
FIG. 1 is a flow diagram of an exemplary process for creating a wine classification chart in accordance with this invention.

Referring to FIG. 1, a first exemplary method in accordance with this invention is described for characterizing wine in terms of fruit and non-fruit flavors. Beginning at step 10, a first scale is provided for scoring wine in terms of relative levels of fruit flavor. As used herein, "fruit flavor" includes the and taste sensations (including aroma and taste) that are intuitively associated with fruit, such as the taste sensations typically associated with apples, peaches, cherries, plums, pears, strawberries, raspberries, blueberries, blackberries, oranges, grapefruit, lemons, mangoes, pomegranates, melons and other similar fruits. The first scale is used to indicate relative level levels of fruit flavor, which may be based on a variety of factors, such as (a) the intensity of fruit aroma, taste and finish; (b) acid balance; and (c) the number and variety of fruits detected.

Wines that have intense fruit aroma, strong fruit flavor, and longer-lasting fruit taste will score higher on the fruit scale than wines that have little or no fruit aroma or taste, or that have a fleeting fruit taste. Likewise, wines that have good acid balance score higher on the fruit scale than wines that are over-acidic (e.g., wines that are sharp on the palate, and that make your mouth pucker), or under-acidic (e.g., wines that lack structure, making the fruit flavor taste mushy). Similarly, wines that exhibit multiple fruit flavors, and multiple types of fruit flavors (e.g., combinations of orchard fruits, tropical fruits and berries), will score higher on the fruit scale than wines that have only one or two fruit flavors, or a single type of fruit flavor.

Next, at step 12, a second scale is provided for scoring wine in terms of relative levels of non-fruit flavor. As used herein, "non-fruit flavor" includes both aromatic and taste sensations that are often found in wine, but that are not intuitively associated with fruit. For example, common non-fruits flavors include oak, cedar, vanilla, earth, smoke, spices, mushrooms, and other similar non-fruit flavors. The second scale is used to indicate relative level levels of non-fruit flavor, which may be based on a variety of factors, such as (a) the intensity of non-fruit aroma, taste and finish; (b) tannic balance; and (c) the number and variety of non-fruit flavors detected.

Wines that have intense non-fruit aroma, strong non-fruit flavor, and longer-lasting non-fruit taste will score higher on the non-fruit scale than wines that have little or no non-fruit aroma or taste, or that have an ephemeral non-fruit taste. Likewise, wines that have good tannic balance (typically only relevant for red wines) score higher on the non-fruit scale than wines that have out-of-balance tannin (e.g., wines that make your tongue feel dried-out and leathery, or wines that lack tannic structure to hold the flavors together, resulting in a flabby sensation). Similarly, wines that exhibit multiple fruit non-flavors, and multiple types of non-fruit flavors (e.g., combinations of organic, earth and wood flavors), will score higher on the non-fruit scale than wines that have only one or two non-fruit flavors, or a single type of non-fruit flavor.

The fruit and non-fruit scales are perceptive scales that may be used for assigning numeric scores, alphabetic scores, or any other similar scores or combination thereof that may be used to classify wine in terms of relative levels of fruit and non-fruit flavor, respectively. Thus, the fruit scale may be numeric scale used to score fruit flavor from a low score of 0 to a high score of 100, and the non-fruit scale may be a numeric scale used to score non-fruit flavor from a low score of 0 to a high score of 100. Alternatively, the fruit scale may be an alphabetic scale used to score fruit flavor from a low score of A to a high score of E, and the non-fruit scale may be a numeric scale used to score non-fruit flavor from a low score of −10 to a high score of +10. Thus, persons of ordinary skill in the art will understand that the type and range of the two scales may be the same or may be different.

The scores on each scale are not used to convey information about wine quality, but instead are used to communicate information about the relative level of the parameter (i.e., fruit or non-fruit) being evaluated. Thus, if the fruit scale has score values ranging from 1–10, a first wine having a score of 1 is not a "bad" wine compared to a second wine having a score of 10. Instead, the first wine has less fruit flavor compared to the second wine, independent of the quality of the two wines. Similarly, if the non-fruit scale has score values ranging from A–E, and the first wine has a score of D and the second wine has a score of B, the second wine has less relative non-fruit flavor than the first wine.

Referring again to FIG. 1, at step 14, wines associated with the low, medium and high scores are determined for the fruit scale. In this calibration step, a group of wines are taste tested, and one or more wines from the group are associated with the low, medium and high scores of the fruit scale. The group of wines may include any collection of wines that exhibit a range of fruit flavors. For example, the group of wines may include the entire collection of wines that are commercially distributed in a geographic region (e.g., the United States), a portion of wines included in a collector's wine cellar, all of the wines available at a particular grocery store, or other similar group of wines. The group of wines may include red and white wines, or may be limited to wines of a single color. Similarly, the group of wines may include still and sparkling wines, or may be limited to one or the other type of wine.

After the wines in the group are tasted, one or more of the wines are assigned the low score on the fruit scale. For example, if the fruit scale has scores ranging from 1–100, the wine or wines having the lowest relative level of fruit flavor in the group are assigned a score of 1. Likewise, the wine or wines having the highest relative level of fruit flavor in the group are assigned a score of 100, and the wine or wines having "average" relative levels of fruit flavor in the group are assigned a score of 50. For example, the results of the calibration step for the fruit scale may be expressed as in the following table:

TABLE 1

| Score | Wine |
| --- | --- |
| 1 (Low) | Carrie Falls 2001 Pinot Grigio |
| 50 (Medium) | Miranda Estate 1999 Chardonnay |
| 100 (High) | Clos Du Charlotte NV (Champagne) |
| | Samantha Crest 2000 Sauvignon Blanc |

Referring again to FIG. 1, at step 16, wines associated with the low, medium and high scores are determined for the non-fruit scale. In this regard, a group of wines are evaluated, and one or more wines from the group are associated with each of the low, medium and high scores of the non-fruit scale. The group of wines may include any collection of wines that exhibit a range of non-fruit flavors. The group of wines may be the same as the group used in step 14, or may be a different group of wines.

After the wines in the group are tasted, one or more of the wines are assigned the low score on the non-fruit scale. For example, if the fruit scale has scores ranging from A–E, the wine or wines having the lowest relative level of non-fruit flavor in the group are assigned a score of A. Likewise, the wine or wines having the highest relative level of non-fruit flavor in the group are assigned a score of E, and the wine or wines having "average" relative levels of non-fruit flavor in the group are assigned a score of C. For example, the results of the calibration step for the non-fruit scale may be expressed as in the following table:

TABLE 2

| Score | Wine |
| --- | --- |
| A (Low) | Carmella Springs 2002 Beaujolais |
| C (Medium) | Tony Ridge 1998 Pinot Noir |
| E (High) | Meadow Heights 2001 Shiraz |

The calibration processes described above may be performed using one or more human wine tasters, or by other similar technique. For example, the calibration process may be performed by an experienced wine taster, a sommelier, a group of wine experts, a wine magazine tasting panel, or other similar individual or group of individuals. Persons of ordinary skill in the art will understand that although the calibration process preferably is performed by experienced wine tasters, anyone may perform the calibration process, regardless of experience or education. Thus, the calibration process may be performed by a store clerk, a college fraternity, or other similar individual or group of individuals.

Figure 2:
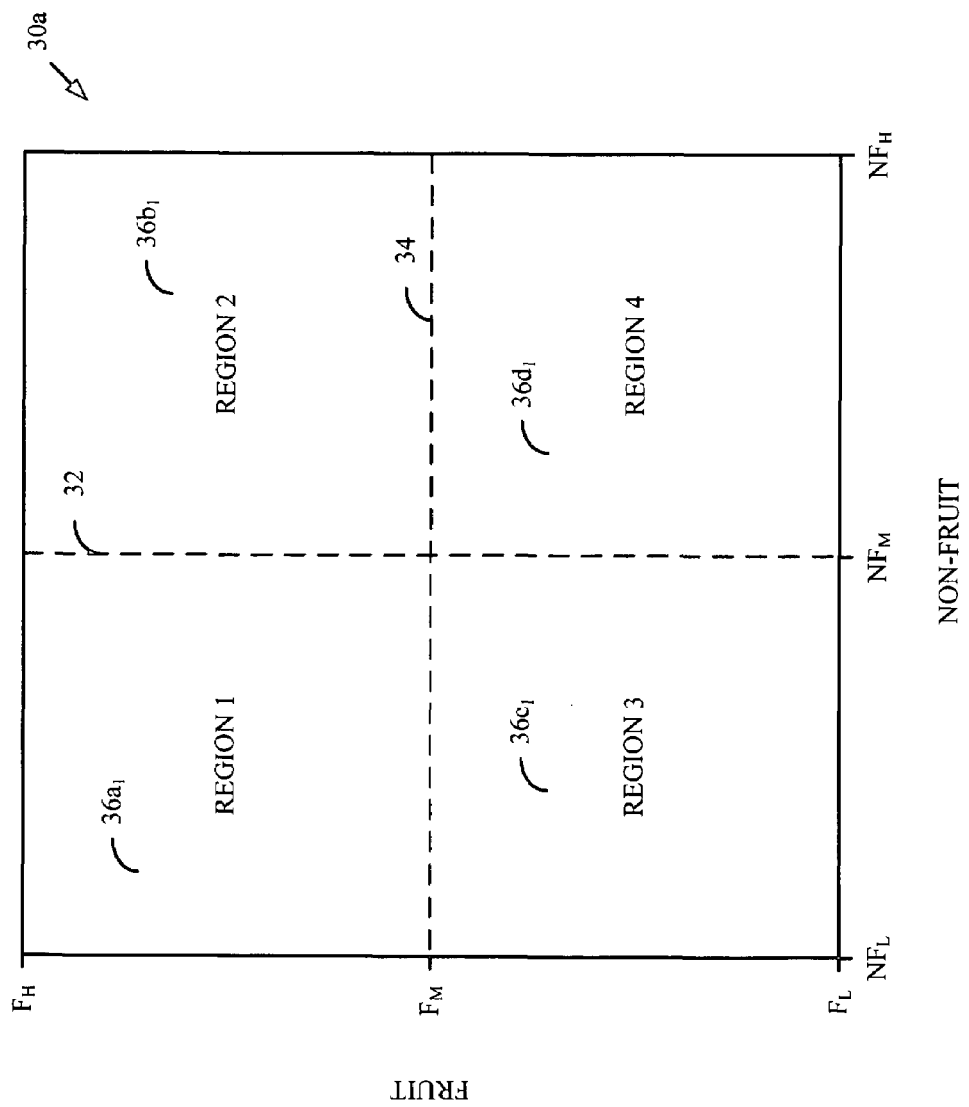
FIG. 2 is an exemplary wine classification chart in accordance with this invention.

Referring again to FIG. 1, at step 18, the fruit and non-fruit scales defined in steps 10–16 are displayed on a wine classification chart. An exemplary wine classification chart is illustrated in FIG. 2. In particular, wine classification chart 30a includes fruit scale 32 and non-fruit scale 34. Fruit scale 32 has low, medium and high scores $F_L$, $F_M$ and $F_H$, respectively, and non-fruit scale 34 has low, medium and high scores $NF_L$, $NF_M$ and $NF_H$, respectively.

Referring again to FIG. 1, at step 20, the wine classification chart is divided into multiple flavor category regions. For example, as shown in FIG. 2, wine classification chart 30a may be divided into four regions $36a_1$–$36d_1$, with each region associated with a corresponding quadrant of the wine classification chart. In the illustrated example, flavor category region $36a_1$ is associated with wines on the upper half of fruit scale 32, and the lower half of non-fruit scale 34, flavor category region $36b_1$ is associated with wines on the upper half of fruit scale 32, and the upper half of non-fruit scale 34, flavor category region $36c_1$ is associated with wines on the lower half of fruit scale 32, and the lower half of non-fruit scale 34, and flavor category region $36d_1$ is associated with wines on the lower half of fruit scale 32, and the upper half of non-fruit scale 34.

Figure 3:
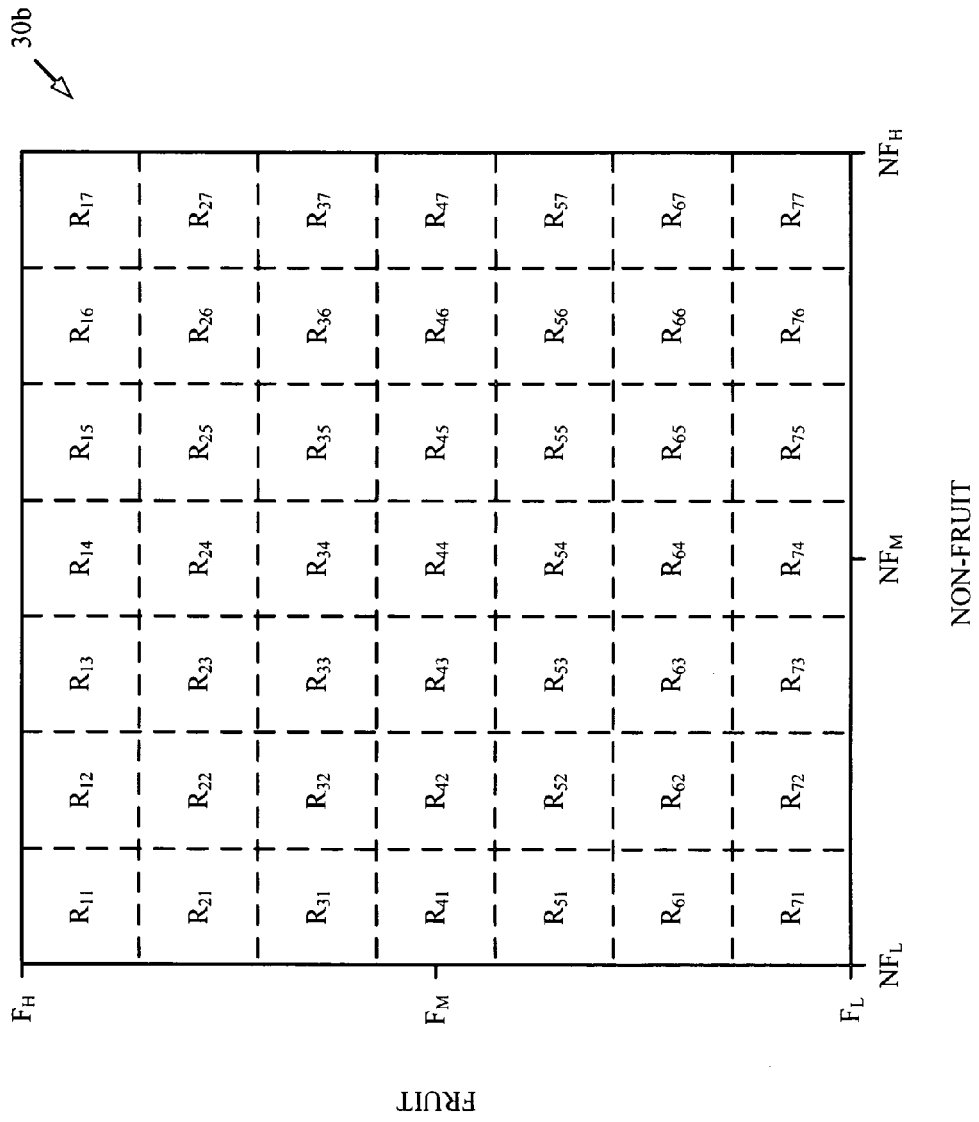
FIG. 3 is an alternative exemplary wine classification chart in accordance with this invention.
Figure 4:
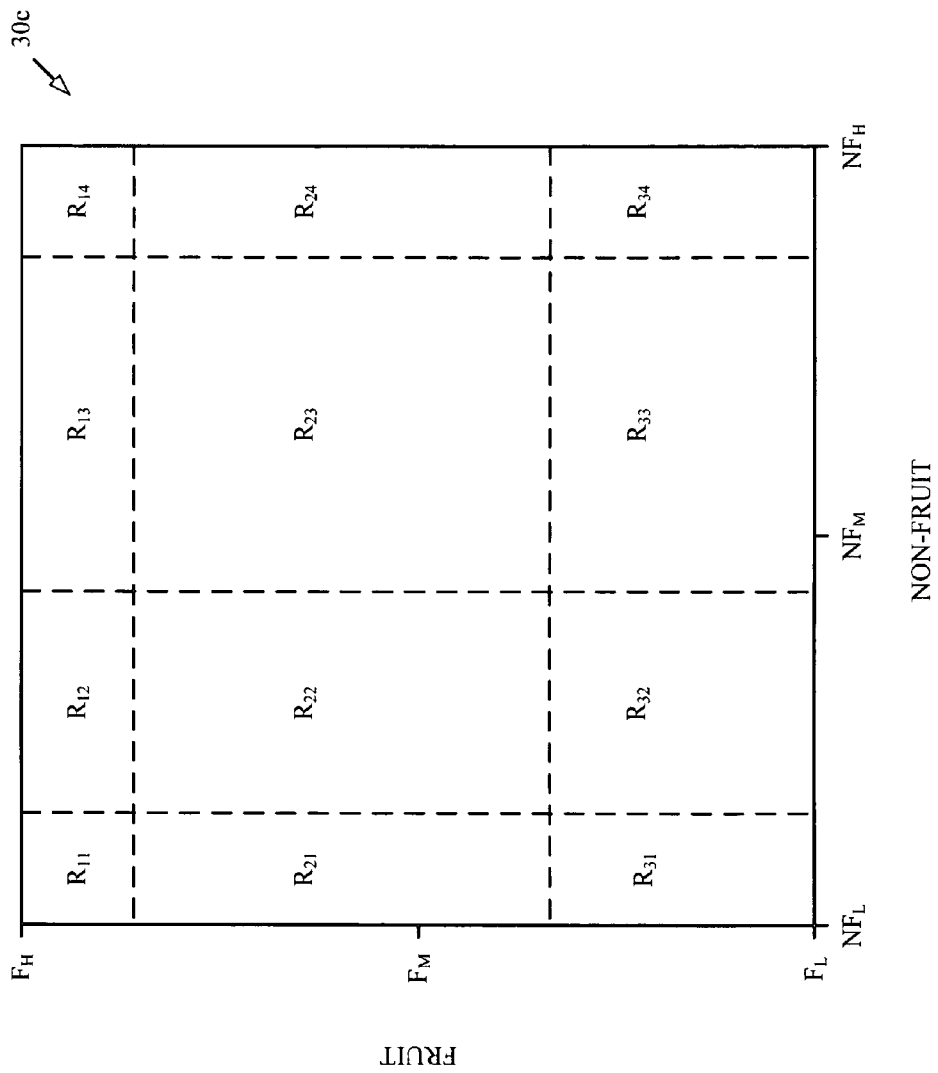
FIG. 4 is another alternative exemplary wine classification chart in accordance with this invention.

Persons of ordinary skill in the art will understand that the wine classification chart may be divided into more or less than four flavor category regions, and that the flavor category regions need not directly correspond with the four quadrants of the wine classification chart. For example, FIG. 3 illustrates wine classification chart 30b divided into forty-nine flavor category regions $R_{11}$–$R_{77}$. As illustrated in this example, flavor category regions $R_{41}$–$R_{47}$ and $R_{14}$–$R_{74}$ in the fourth row and fourth column overlap portions of multiple quadrants of wine classification chart 30b. Persons of ordinary skill in the art also will understand that the flavor category regions need not be the same size. For example, FIG. 4 illustrates wine classification chart 30c divided into twelve flavor category regions $R_{11}$–$R_{34}$, none of which is the same size as any other flavor category region.

Figure 5:
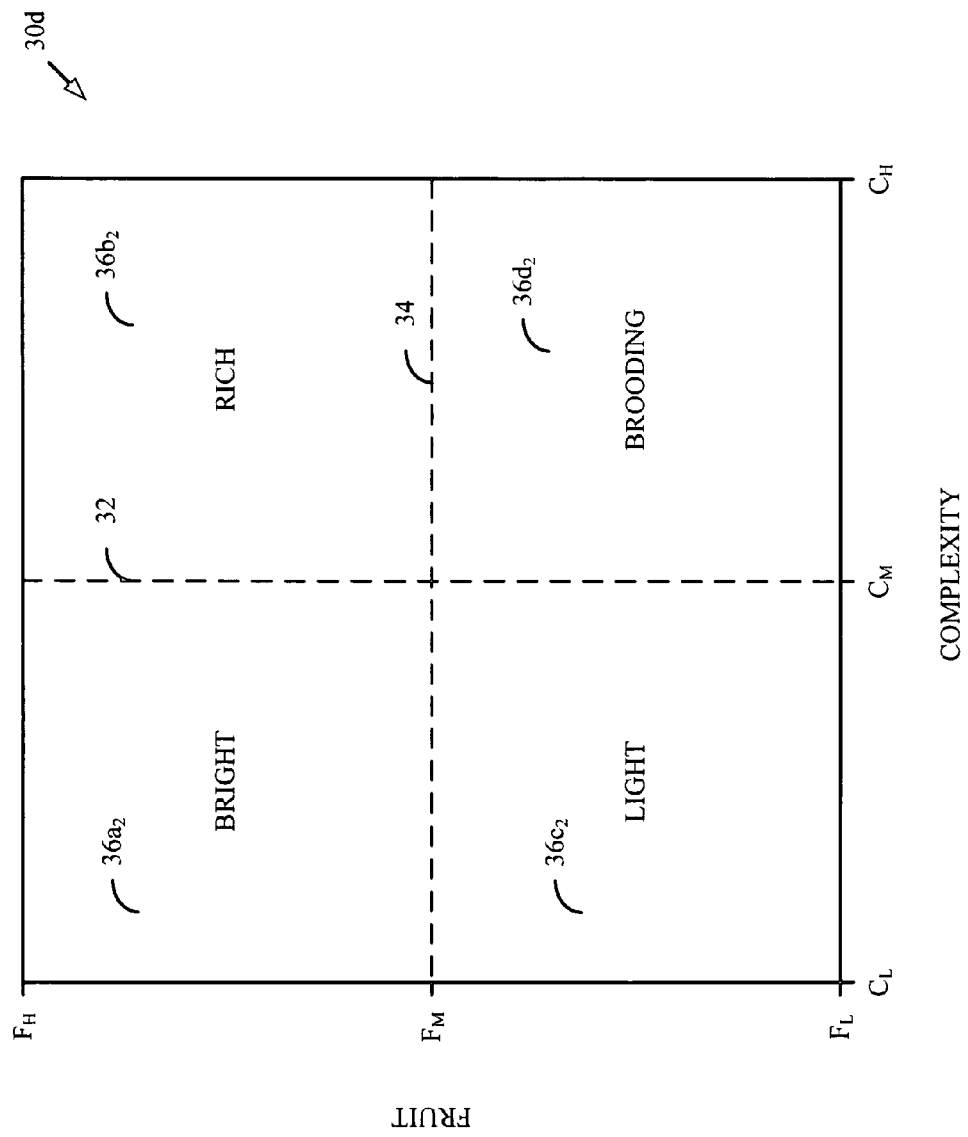
FIG. 5 is still another alternative exemplary wine classification chart in accordance with this invention.

Referring again to FIG. 1, at step 22, the various flavor category regions are displayed on the wine classification chart. Thus, referring again to FIG. 2, wine classification chart 30a includes flavor category regions $36a_1$–$36d_1$, designated as "REGION 1"–"REGION 4," respectively. Persons of ordinary skill in the art will understand that fruit scale 32 and non-fruit scale 34 may be referred to by names other than "fruit" and "non-fruit," and that flavor category regions $36a_1$–$36d_1$, may also be referred to by names other than "REGION 1"–"REGION 4." For example, as illustrated in FIG. 5, wine classification chart 30d includes fruit scale 32 and non-fruit scale 34 designated as "FRUIT" and "COMPLEXITY," respectively, and flavor category regions $36a_1$–$36d_1$ designated as "BRIGHT," "RICH," "LIGHT" AND "BROODING," respectively. For simplicity, the remaining description will use the term "Fruit" to refer to fruit flavor, and "Complexity" to refer to non-fruit flavor, and will use the terms "Bright," "Rich," "Light" and "Brooding," to refer to the four flavor category regions $36a_1$–$36d_1$, as illustrated in FIG. 5.

Figure 6:
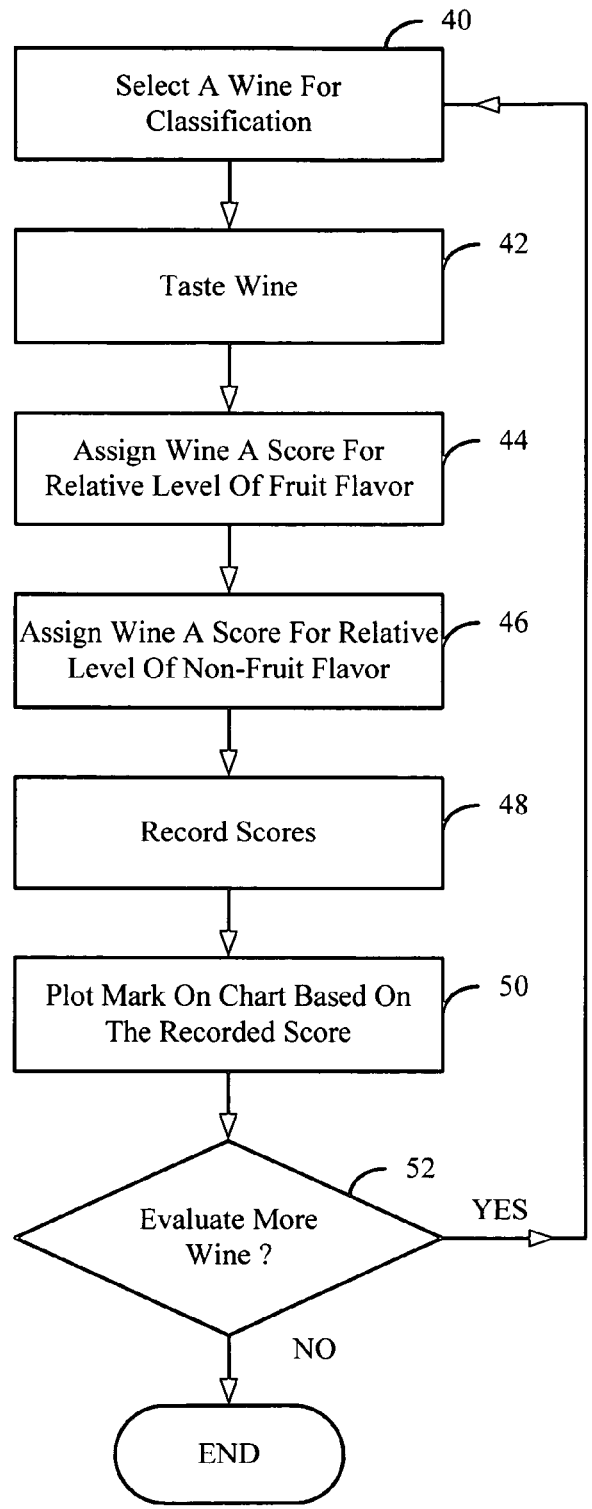
FIG. 6 is a flow diagram of an exemplary process for classifying wine in accordance with this invention.

Wine classification charts in accordance with this invention, such as the exemplary wine classification chart created by the process of FIG. 1, may be used to record and visually communicate information about Fruit and Complexity of individual wines. Referring now to FIG. 6, an exemplary process is described for classifying wine using a wine classification chart. Beginning at step 40, a wine is selected for classification. The selected wine may be any wine that may be classified using the wine classification chart. For example, if the wine classification chart may be used for all wines, the selected wine may be any wine. If, however, the wine classification chart was created solely for classifying a single type of wine (e.g., red wine), the selected wine preferably should belong to the same type.

Next, at step 42, the selected wine is tasted by an individual or a group of individuals who are familiar with the taste of the wines that are associated with the low, medium and high scores on the Fruit and Complexity scales of the wine classification chart. In this regard, the taster may be the same individual or group of individuals who calibrated the wine classification chart, or may be a different individual or group of individuals. As long as the taster is familiar with the taste of the wines associated with the low, medium and high scores of the Fruit and Complexity scales, the taster may classify the selected wine using the wine classification chart.

At step 44, the selected wine is assigned a score on the Fruit scale between low score $F_L$ and high score $F_H$. In this regard, the Fruit score assigned to the selected wine is based on the wine's relative level of fruit flavors compared with the range of fruit flavors of other wines having Fruit scores between $F_L$ and $F_H$. For example, if the Fruit scale has a low score $F_L=0$ and a high score $F_H=100$, and the selected wine has fruit flavors that taste greater than the fruit flavors of wine associated with the low score of 0, and less than the fruit flavors of wine associated with the middle score of 50, the selected wine may be assigned a Fruit score of 25. In this regard, as more wines are tasted and scored, the more refined the scoring may become. Thus, if the selected wine has fruit flavors that taste greater than the fruit flavors of a wine having a Fruit score of 10, and less than the fruit flavors of a wine having a Fruit score of 20, the selected wine may be assigned a Fruit score of 15.

Similarly, at step 46, the selected wine is assigned a score on the Complexity scale between low score $C_L$ and high score $C_H$. In this regard, the Complexity score assigned to the selected wine is based on the wine's relative level of non-fruit flavors compared with the range of non-fruit flavors of other wines having Complexity scores between $C_L$ and $C_H$. For example, if the Complexity scale has a low score $C_L=0$ and a high score $C_H=100$, and the selected wine has non-fruit flavors that taste greater than the non-fruit flavors of wine associated with the middle score of 50, and less than the non-fruit flavors of wine associated with the high score of 100, the selected wine may be assigned a Complexity score of 75. In this regard, as more wines are tasted and scored, the more refined the scoring may become. Thus, if the selected wine has non-fruit flavors that taste greater than the non-fruit flavors of a wine having a Complexity score of 80, and less than the non-fruit flavors of a wine having a Complexity score of 90, the selected wine may be assigned a Complexity score of 85.

Next, at step 48, the Fruit and Complexity scores assigned to the selected wine may be recorded. For example, the scores may be recorded in a computer file, such as a database, stored in computer readable storage media, such as a floppy disk, hard disk, optical disk, programmable read-only memory device, flash memory device, integrated circuit memory device, or in other similar media. Alternatively, the Fruit and Complexity scores may be recorded in any other suitable fashion, such as writing the scores on paper, a blackboard, a whiteboard, or other similar media. In addition to recording Fruit and Complexity scores, other non-flavor characteristics of the selected wine also may be recorded. For example, information regarding the selected wine's color, vintage, growing region, grape variety, price, quality, vintner and other similar factors also may be recorded. Further, the Fruit and Complexity scores recorded for the selected wine may be based on individual scores provided by one tester, or may be based on multiple scores provided by multiple testers. For example, a group of people may taste the selected wine and collectively agree on Fruit and Complexity scores, or may individually assign Fruit and Complexity scores and then average the results of all scores on each scale.

Figure 7:
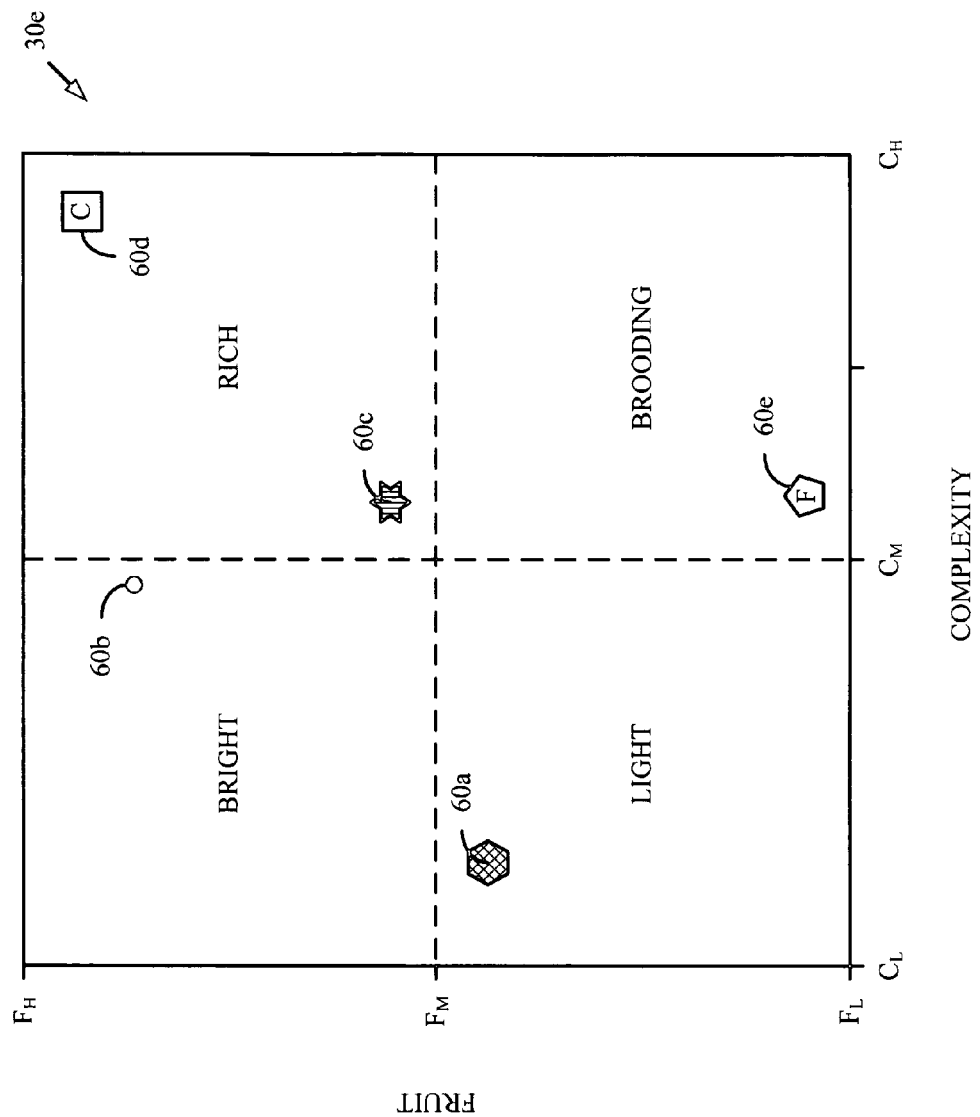
FIG. 7 is an exemplary wine classification chart constructed in accordance with the method of FIG. 6.

Next, at step 50, a reference mark associated with the selected wine may be plotted on the wine classification chart based on the recorded Fruit and Complexity scores. For example, FIG. 7 illustrates an exemplary wine classification chart 30e that includes multiple reference marks 60a–60e that represent the Fruit and Complexity scores of five different wines. Each of reference marks 60a–60e may have a first distinctive characteristic (e.g., shape, size, color or other similar characteristic) that may be used to uniquely identify a particular wine. Thus, reference mark 60a may be a hexagonal marker used to identify a first wine (e.g., "Wine A"), reference mark 60b may be a circular marker used to identify a second wine (e.g., "Wine B"), reference mark 60c may be a star-shaped marker used to identify a third wine (e.g., "Wine C"), reference mark 60d may be a square marker used to identify a fourth wine (e.g., "Wine D"), and reference mark 60e may be a pentagonal marker used to identify a fifth wine (e.g., "Wine E").

In this regard, the use of distinctive reference marks 60a–60e, and the placement of the reference marks on wine classification chart 30e may be used to visually communicate information regarding the relative taste of the five different wines. Indeed, wine classification chart 30e may be used to communicate information regarding an individual wine relative to all other wines in the group. For example, exemplary wine classification chart 30e indicates that Wine A (reference mark 60a) is a Light wine that has moderate fruit flavor, and relatively low non-fruit flavor, whereas Wine D (reference mark 60d) is a Rich wine that has very strong fruit and non-fruit flavors. Thus, the wine classification chart provides a useful vocabulary that may be used to communicate flavor information regarding individual wines.

In addition, wine classification chart 30e may be used to communicate flavor information about a wine relative to one or more other wines on the chart. For example, exemplary wine classification chart 30e indicates that Wine C (reference mark 60c) and Wine E (reference mark 60e) have approximately the same level of non-fruit flavor, but that Wine C, classified as a Rich wine, has much stronger fruit flavor than Wine E, which is classified as a Brooding wine. Likewise, if a user is familiar with the taste of Wine A (reference mark 60a), and would like to taste a wine of similar fruit flavor, but much higher non-fruit flavor, wine classification chart 30e indicates that Wine C may be a suitable choice. Thus, the wine classification chart provides a useful vocabulary that also may be used to communicate flavor information regarding wines relative to one another.

Further, reference marks 60a–60e may also have a second distinctive characteristic (e.g., shape, size, color or other similar characteristic) that may be used to communicate non-flavor information about wines represented on the chart. For example, the color of reference marks 60 may be used to communicate information about wine quality, or wine ratings score. Thus, a green reference mark 60a (shown using a cross-hatched fill pattern) may indicate a very high quality wine (e.g., a wine having a quality score between 90–100 on a particular wine ratings scale), whereas a blue reference mark 60c (shown using a striped fill pattern) may indicate a medium-quality wine (e.g., a wine having a quality score of 70–90). Similarly, an alphabetic symbol included with reference marks 60 may be used to communicate information about the wine growing region of the wines on the chart. Thus, a reference mark 60e may have an included letter "F," indicating that the wine is from France, whereas reference mark 60d may have an included letter "C," indicating that the wine is from California. Persons of ordinary skill in the art will understand that other characteristics of reference marks 60 may be used to visually communicate other non-flavor characteristics associated with wines represented on the chart.

Referring again to FIG. 6, at step 52, a decision is made whether more wine will be evaluated. If more wine is to be evaluated, the process returns to step 40, and a new wine is selected, and the process of tasting, scoring, recording and plotting set forth in steps 42–50 are repeated for the new wine. If, however, no more wine is to be evaluated, the process stops.

Figure 8:
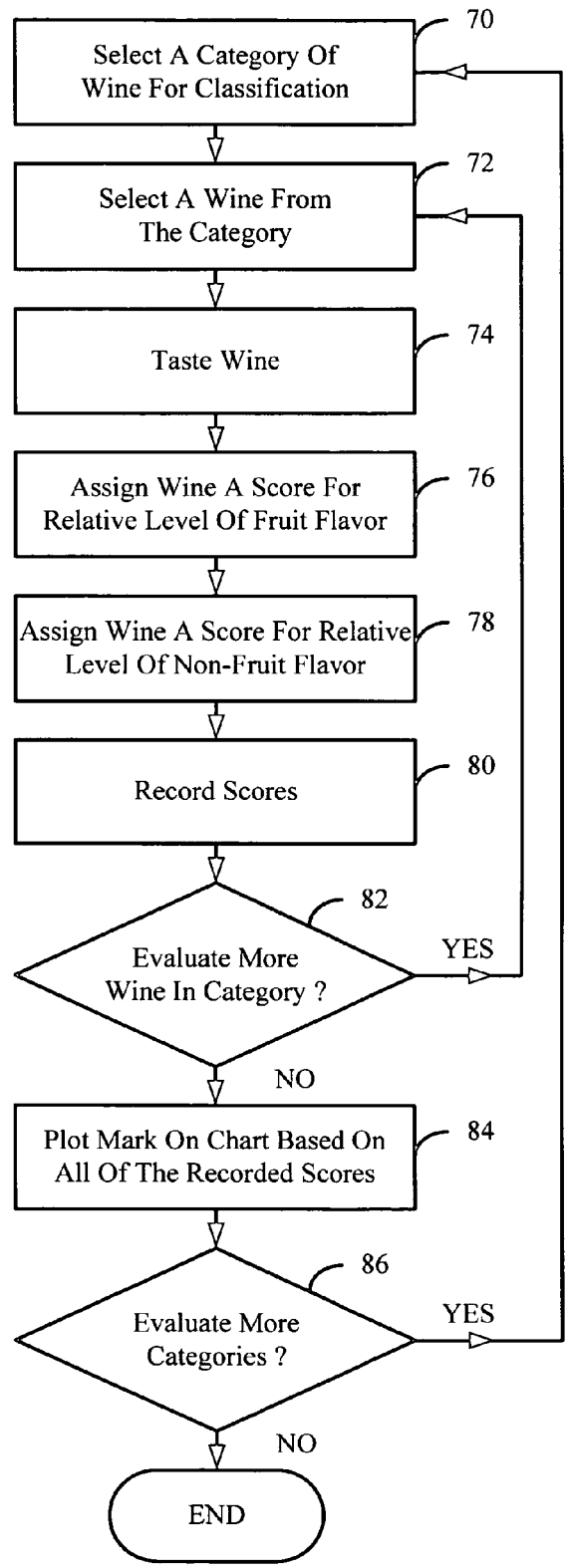
FIG. 8 is a flow diagram of an exemplary process for classifying wine categories in accordance with this invention.

Wine classification charts in accordance with this invention also may be used to record and visually communicate information about Fruit and Complexity of categories or groups of wine. Referring now to FIG. 8, an exemplary process is described for classifying one or more categories of wine using a wine classification chart. Beginning at step 70, a category of wine is selected for classification. Exemplary categories include color (e.g., red, white), effervescence (e.g., sparkling, still), geographic region (e.g., California, France), varietal (e.g., Pinot Noir, Malbec), or other similar categories.

Next at step 72, a wine is selected from the selected category, and at step 74, the selected wine is tasted by an individual or a group of individuals who are familiar with the taste of the wines that are associated with the low, medium and high scores on the Fruit and Complexity scales of the wine classification chart. At step 76, the selected wine is assigned a score on the Fruit scale between low score $F_L$ and high score $F_H$, and at step 78, the selected wine is assigned a score on the Complexity scale between low score $C_L$ and high score $C_H$. At step 80, the Fruit and Complexity scores assigned to the selected wine may be recorded. Next, at step 82, a decision is made whether more wine in the selected category will be evaluated. If more wine is to be evaluated, the process returns to step 72, and a new wine from the selected category is chosen, and the process of tasting, scoring and recording set forth in steps 74–80 are repeated for the new wine.

Figure 9:
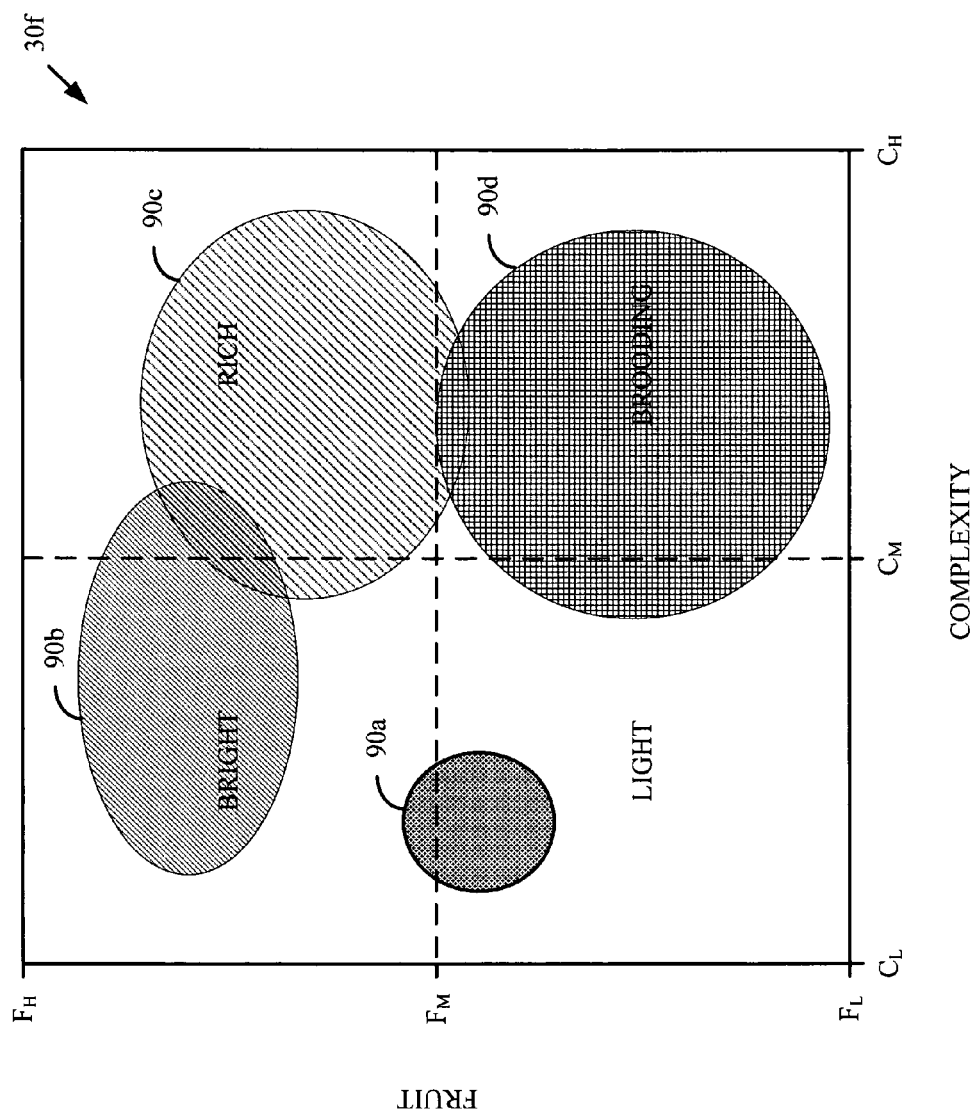
FIG. 9 is an exemplary wine category classification chart constructed in accordance with the method of FIG. 8.

If, however, no more wine from the elected category is to be evaluated, the process proceeds to step 84, and a reference mark is plotted on the wine classification chart based on the recorded scores of all of the wines that were tasted in the selected category. For example, FIG. 9 illustrates an exemplary wine classification chart 30f that includes multiple reference marks 90a–90d that represent the range of Fruit and Complexity scores for wines from four different categories. Each of reference marks 90a–90d may have a distinctive pattern that may be used to uniquely identify a particular wine category. Thus, reference mark 90a may be a cross-hatched marker used to identify a first wine category (e.g., "Wine Category A"), reference mark 90b may be a narrow-hatched marker used to identify a second wine category (e.g., "Wine Category B"), reference mark 90c may be a wide-hatched marker used to identify a third wine category (e.g., "Wine Category C"), and reference mark 90d may be a grid marker used to identify a fourth wine category (e.g., "Wine Category D").

In this regard, the use of distinctive reference marks 90a–90e, and the placement of the reference marks on wine classification chart 30f may be used to visually communicate information regarding the relative taste of the four different wine categories. Indeed, wine classification chart 30f may be used to communicate information regarding an individual wine category relative to all other wine categories. For example, exemplary wine classification chart 30f indicates that Wine Category A includes primarily Light wines that have moderate fruit flavors, and relatively low non-fruit flavors, whereas Wine Category C includes primarily Rich wines that have very moderate to strong fruit and non-fruit flavors. Thus, the wine classification chart provides a useful vocabulary that may be used to communicate flavor information regarding individual wine categories.

In addition, wine classification chart 30f may be used to communicate flavor information about a wine category relative to one or more other wine categories on the chart. For example, exemplary wine classification chart 30f indicates that Wine Categories C and D have approximately the same level of non-fruit flavor, but that Wine Category C, classified as including primarily Rich wines, has much stronger fruit flavor than Wine Category E, which is classified as including primarily Brooding wines. Likewise, if a user is familiar with the general taste of wines in Wine Category A, and would like to taste wines of similar non-fruit flavor, but much higher fruit flavor, wine classification chart 30f indicates that wines included in Wine Category B may be a suitable choice. Thus, the wine classification chart provides a useful vocabulary that also may be used to communicate flavor information regarding wine categories relative to one another.

Referring again to FIG. 8, at step 86, a decision is made whether more wine categories will be evaluated. If more wine categories are to be evaluated, the process returns to step 70, a new wine category is selected, and the process of selecting wines from the category, and then tasting, scoring, recording and plotting set forth in steps 74–84 are repeated for the new wine category. If, however, no more wine categories are to be evaluated, the process stops.

Persons of ordinary skill in the art will understand that exemplary apparatus for implementing at least some aspects of this invention include a computer, such as a personal computer, laptop computer, handheld computer, personal digital assistant, cellular telephone, or other similar computer device. Such computing devices may include a processor coupled to a computer memory device, such as read only memory, hard disk, magnetic disk, optical disk, or other suitable computer media that may be used to store software modules, computer processor instructions, and/or other data used to implement methods of this invention. Indeed, a computer may be programmed with software that may be used to construct and display wine classification charts in accordance with this invention, and to assist a user in classifying wine and wine categories in terms of fruit and non-fruit flavors.

In addition, a computer may be programmed with software that may be used to assist a user with comparing and selecting wine and wine categories based on fruit and non-fruit flavors. For example, a user may be familiar with the taste of a particular wine, and may want to find other wines that have similar taste. A computer may be programmed to prompt the user for the name of the wine, and then retrieve the Fruit and Complexity scores for the specified wine from a database that includes the Fruit and Complexity scores for a wide range of wines. The computer may also be programmed to then retrieve from the database the names of other wines whose Fruit and Complexity scores are similar to the score of the specified wine, and then display the name of the identified wines to the user.

Moreover, the computer may be programmed to provide alternative wine suggestions based on favor differences relative to the specified wine. For example, the user may want to sample wines that have higher or lower Fruit scores and/or higher or lower Complexity scores relative to the corresponding scores of the specified wine. Thus, the computer may be programmed to prompt the user to enter such flavor difference requests, and may then retrieve from the database the names of wines that satisfy the user's specified criteria, and display the search results to the user.

Further, a computer may be programmed with software to predict fruit and non-fruit flavors of a new wine based on the Fruit and Complexity scores of previously tested wines. For example, if the database referred to above also includes non-flavor characteristics (e.g., the wine's color, vintage, growing region, grape variety, price, quality, vintner or other similar factors) for the wines in the database, a computer may be programmed to prompt a user for one or more non-flavor characteristics of the new wine, and may then retrieve from the database the Fruit and Complexity scores of wines having similar non-flavor characteristics. The computer may then analyze the retrieved data to detect patterns between the fruit and non-fruit characteristics of wine in the database, and may apply those patterns to predict the flavor of a new wine. For example, if the new wine is a 2002 Chardonnay from a particular region, computer analysis may reveal that similar wines from the same region have Fruit scores that range between 60–70, and Complexity scores that range between 25–35. Based on that analysis, the computer may predict the Fruit and Complexity scores of the new wine within those ranges. After the new wine has been tasted, and assigned Fruit and Complexity scores, the assigned scores may be compared with the predicted scores to further refine the prediction model.

In addition to predicting the current taste of a wine, a computer may be programmed with software to predict the fruit and non-fruit flavors of wine over time. In particular, as a wine ages, the fruit and non-fruit flavors typically change. For example, five years after bottling, a particular wine may experience a 10% increase in Fruit score and a 17% increase in Complexity score, whereas at eleven years after bottling, the same wine may have a 3% decrease in Fruit score and a 28% decrease in Complexity score. If the database referred to above also includes temporal information regarding the Fruit and Complexity scores for the wines in the database, a computer may be programmed to analyze such temporal data, and develop models that predict the Fruit and Complexity scores of wine over time. Thus, the computer may be programmed to prompt a user for the name of a wine, and may then apply the temporal models to predict the Fruit and Complexity scores of the wine at specific future dates (e.g., 5, 10, 15 years from bottling).

Alternatively, using any other well-known technique for predicting the flavor characteristics of wine over time, the computer may be programmed to calculate and display flavor trajectories of Fruit and Complexity scores over time on a wine classification chart. In this regard, if a user would like to taste a wine when the wine's fruit flavor is at its peak, the user may visually determine from the displayed flavor trajectory the best time to open the wine. Additionally, the computer may be programmed to calculate and display flavor trajectories for multiple wines, and a user may visually compare the flavor trajectories select one or more wines having the most desirable temporal flavor characteristics.

The foregoing merely illustrates the principles of this invention, and various modifications can be made by persons of ordinary skill in the art without departing from the scope of this invention.

The invention claimed is:

1. A method for characterizing a wine, the method comprising:
    providing a first scale for scoring wine in terms of relative levels of fruit flavor;
    providing a second scale for scoring wine in terms of relative levels of non-fruit flavor;
    assigning the wine a first score on the first scale;
    assigning the wine a second score on the second scale;
    providing a chart comprising a first axis corresponding to the first scale, and a second axis corresponding to the second scale; and
    plotting a reference mark on the chart using the first and second scores, the reference mark associated with the wine.

2. The method of claim 1, wherein the first scale comprises a third score that corresponds to a relatively low level of fruit flavor, and a fourth score that corresponds to a relatively high level of fruit flavor.

3. The method of claim 2, wherein assigning the first score comprises assigning the wine the first score between the third and fourth scores.

4. The method of claim 1, wherein the second scale comprises a fifth score that corresponds to a relatively low level of non-fruit flavor, and a sixth score that corresponds to a relatively high level of non-fruit flavor.

5. The method of claim 4, wherein assigning the second score comprises assigning the wine the second score between the fifth and sixth scores.

6. The method of claim 1, wherein the chart comprises a midpoint corresponding to a midpoint of the first axis and a midpoint of the second axis.

7. The method of claim 1, wherein the first axis corresponds to a y-axis, and the second axis corresponds to an x-axis.

8. The method of claim 1, further comprising segregating the chart into a plurality of non-overlapping regions that collectively encompass the entire first and second scales.

9. Apparatus for characterizing wine, the apparatus comprising:

a processor;

a memory device operatively coupled to the processor, the memory device storing a software program structured to cause the processor to:

display a chart comprising a first axis for scoring wine in terms of relative levels of fruit flavor, and a second axis for scoring wine in terms of relative levels of non-fruit flavor;

receive a first score for a first wine on the first scale and a second score for the first wine on the second scale;

associate a first reference mark with the first wine;

plot the first reference mark on the chart based on the first and second scores;

receive a third score for a second wine on the first scale and a fourth score for the second wine on the second scale;

associate a second reference mark with the second wine; and plot the second reference mark on the chart based on the third and fourth scores.

10. The apparatus of claim 9, wherein the first and second reference marks each have a first distinctive characteristic that may be used to uniquely identify the first and second wines, respectively.

11. The apparatus of claim 9, wherein the first and second reference marks each have a second distinctive characteristic that may be used to communicate non-flavor information about the first and second wines, respectively.

12. The apparatus of claim 11, wherein the non-flavor information comprises any one of color, vintage, growing region, grape variety, price, quality or vintner.

* * * * *